United States Patent
Downey et al.

(10) Patent No.: US 8,781,730 B2
(45) Date of Patent: Jul. 15, 2014

(54) ROUTE SELECTION EMPLOYING METRICS

(75) Inventors: David J. Downey, Louisburg, KS (US); Choy Wai Lee, Olathe, KS (US); Kenneth A. Carlson, Olathe, KS (US)

(73) Assignee: Garmin Switzerland GmbH (CH)

( * ) Notice: Subject to any disclaimer, the term of this patent is extended or adjusted under 35 U.S.C. 154(b) by 430 days.

(21) Appl. No.: 13/084,101

(22) Filed: Apr. 11, 2011

(65) Prior Publication Data

US 2012/0259541 A1      Oct. 11, 2012

(51) Int. Cl.
*G01C 21/34*   (2006.01)
*G08G 1/123*   (2006.01)

(52) U.S. Cl.
USPC ........... 701/433; 701/410; 701/411; 701/420; 701/423; 701/428; 701/432; 701/533; 340/995.11; 340/995.14; 340/995.27

(58) Field of Classification Search
USPC ......... 701/117, 410, 411, 414, 420, 423, 428, 701/431–433, 454, 468, 532, 533; 340/990, 340/995.1, 995.12–995.27; 342/357.31, 342/457
See application file for complete search history.

(56) References Cited

U.S. PATENT DOCUMENTS

| | | | |
|---|---|---|---|
| 5,220,507 A | 6/1993 | Kirson | 364/444 |
| 5,270,937 A | 12/1993 | Link et al. | 364/449 |
| 5,790,976 A * | 8/1998 | Boll et al. | 455/456.5 |
| 6,845,323 B1 | 1/2005 | Beason et al. | 701/213 |
| 6,862,525 B1 | 3/2005 | Beason et al. | 701/213 |
| 6,892,135 B1 * | 5/2005 | Krull et al. | 701/431 |
| 7,079,948 B2 * | 7/2006 | Morita et al. | 701/408 |
| 7,298,327 B2 * | 11/2007 | Dupray et al. | 342/451 |
| 7,840,346 B2 | 11/2010 | Huhtala et al. | 701/209 |
| 2006/0136173 A1 | 6/2006 | Case, Jr. et al. | 702/182 |
| 2009/0149155 A1 * | 6/2009 | Grossman | 455/411 |

FOREIGN PATENT DOCUMENTS

JP      2005-195476 A     7/2005
KR   10-2007-0089409 A   8/2007

OTHER PUBLICATIONS

Garmin's EDGE 605/705 GPS-Endabled Bike Computer Owner's Manual, Nov. 2007.
Garmin's EDGE 800 Touchscreen GPS-Enabled Bike Computer Owner's Manual, Jul. 2010.
International Search Report from corresponding International Application No. PCT/US2012/028084, dated Oct. 4, 2012.

* cited by examiner

*Primary Examiner* — Muhammad Shafi
*Assistant Examiner* — Majdi Alsomiri
(74) *Attorney, Agent, or Firm* — Samuel M. Korte; Mohammad M. Ali

(57) ABSTRACT

Techniques are described that may be implemented in a mobile electronic device providing navigation functionality to facilitate selection of a route to a destination from multiple route options. In one or more implementations, route selection information is displayed on a display of the mobile electronic device to facilitate selection of a route to a destination. The route selection information describes one or more routes to the destination and includes one or more metrics, associated with each route, that identify a characteristic of the route (e.g., a difficulty rating, topography, total climb distance, number of turns, and so on). A map may then be displayed on the display to furnish navigation information for the selected route to facilitate navigation to the destination.

18 Claims, 5 Drawing Sheets

ROUTE SELECTION EMPLOYING METRICS

BACKGROUND

Because of their relatively small size and form, mobile electronic devices such as smart phones, personal navigation devices (PNDs), personal digital assistants (PDAs), and so forth, offer several practical advantages with respect to providing maps and map-related content to a user. For example, because of their small form and consequent portability, mobile electronic devices are capable of providing real-time navigational instructions to users in a convenient fashion, while the users are in route to a destination.

Mobile electronic devices may be used to enhance a wide variety of fitness and sporting activities. Cycle computers and sport watches are examples of mobile electronic devices that are used by cyclists and runners to measure performance data and to provide information that is useful to the cyclist or runner. Cycle computers and sport watches commonly measure speed, distance traveled, cadence, heart rate, calories burned, and so forth, and display this data to their users. Increasingly, these devices are being equipped with global positioning system (GPS) receivers to provide position determining functionality. This functionality allows the devices to furnish navigation information to the cyclists and runners who use them.

SUMMARY

Techniques are described that may be implemented in a mobile electronic device providing navigation functionality to facilitate the selection of a route to a destination from multiple route options. In one or more implementations, route selection information is displayed on a display of the mobile electronic device to facilitate selection of a route to a destination. The route selection information describes one or more routes to the destination and includes one or more metrics, associated with each route, identifying a characteristic of the route (e.g., a difficulty rating, topography, total climb distance, number of turns, and so on). A map may then be displayed on the display to furnish navigation information for the selected route to facilitate navigation to the destination.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
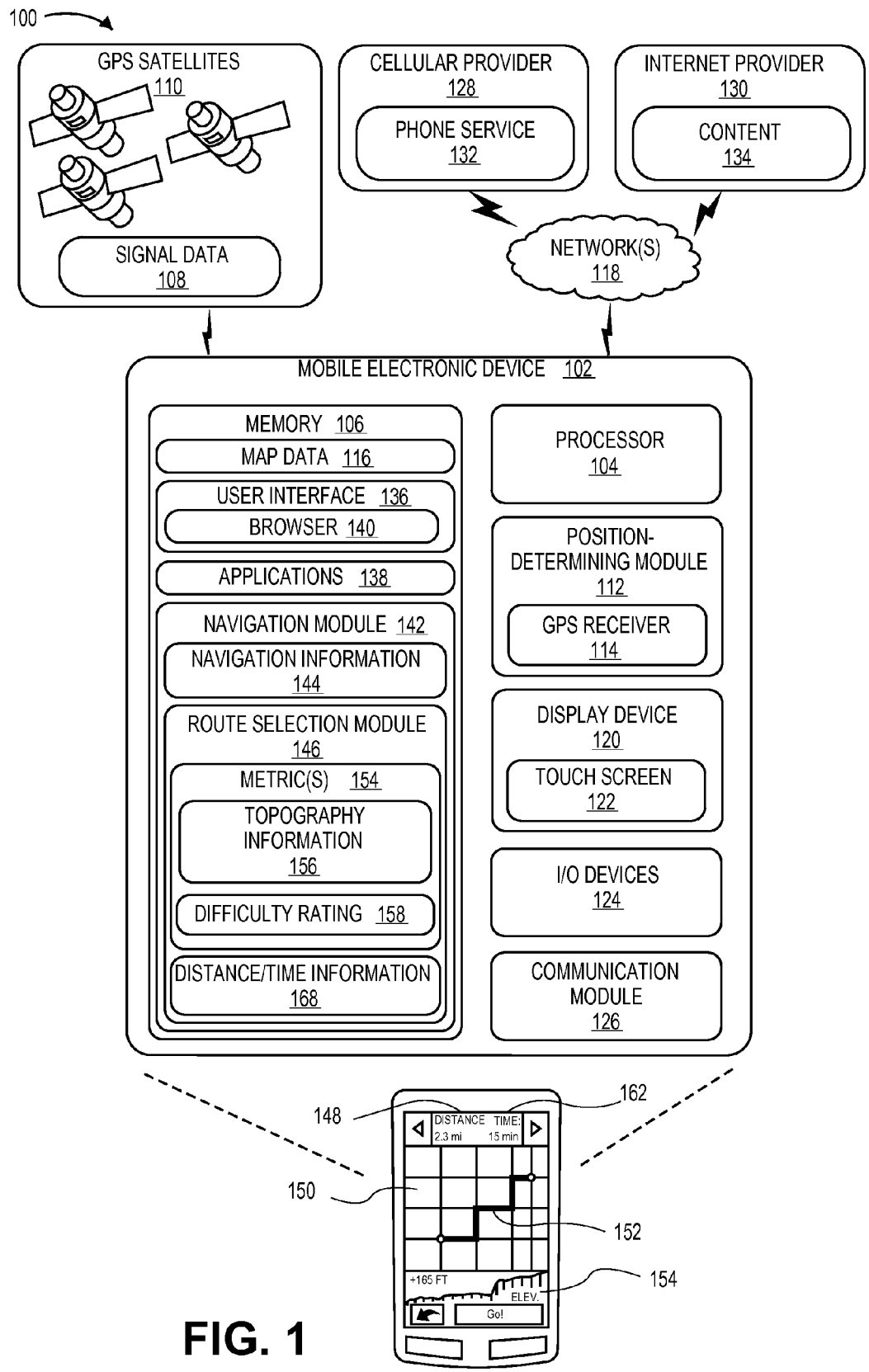
FIG. 1 is an illustration of an example environment in which techniques may be implemented in a mobile electronic device providing navigation functionality to configure the mobile electronic device to facilitate the selection of a route to a destination from multiple route options.

Mobile electronic devices commonly used in fitness and sporting activities include cycle computers, sport watches, golf computers, smart phones providing fitness or sporting applications (apps), hand-held GPS devices, and so forth. These devices may be equipped to provide position determining functionality, allowing the devices to furnish navigation information to their users. For example, a cycle computer equipped with a GPS receiver may be configured to furnish turn by turn directions for routing a cyclist to a desired destination. Typically, mobile electronic devices equipped to provide navigation functionality automatically select the shortest or fastest route to the destination without user intervention. Other mobile electronic devices may allow for route planning. However, these devices typically must be coupled to a computer such as a desktop or laptop computer so that the route may be planned using software loaded onto the computer and downloaded to the device.

Exercisers engaged in fitness and sporting activities often wish to explore multiple routes to a common destination. The selection of alternative routes may provide new and interesting experiences for the user. For example, a jogger may intentionally run a different route on Tuesday than on Monday. Moreover, some routes may offer a greater or lesser physical challenge to the user than the most direct or fastest route. For example, a cyclist who bikes to work each day via the same route may want to explore alternative routes to explore new areas of his or her locale, or to increase the physical challenge experienced.

Accordingly, techniques are described that may be implemented in a mobile electronic device equipped to provide navigation functionality to facilitate the selection of a route to a destination from multiple route options. The route selection techniques described are well suited for use by mobile electronic devices configured for use during fitness and/or sporting activities such as cycle computers, sport watches, golf computers, smart phones providing fitness or sporting applications (apps), hand-held GPS devices, and so forth. However, it is nevertheless contemplated that the techniques may be implemented in any mobile electronic device that includes navigation functionality.

In one or more implementations, the techniques may be implemented as one or more software modules stored in the memory of the device and executed by the processing system of the device. As described herein, the processing system may execute the module(s) to generate one or more routes to a destination from a determined geographic position using map data stored in memory of the device. Each of the one or more routes includes a metric describing a characteristic of the route, such as a difficulty rating, topographic information (e.g., an elevation profile for the route), total climb distance, number of turns, and so on. Route selection information is then displayed on a display of the mobile electronic device to allow a user of the device to select a desired route from the generated routes. In implementations, the route selection information includes a graphical display of the routes and the metric associated with each route (e.g., a graphical display of topographic information describing the elevation profile of the route). A route may then be selected from the one or more routes available via an input by the user to an input device (e.g., touchscreen, input buttons, etc.) of the mobile electronic device. A map may then be displayed on the display to furnish navigation information for the selected route to facilitate navigation to the destination.

The techniques described herein thus allow the user of the mobile electronic device to select a route, which may not be the shortest or fastest route to the destination, based upon a variety of criteria. Thus, the user may explore multiple routes to a common destination. Routes that offer greater or lesser physical challenge may be selected depending on the goals of the user. For instance, the user may select a route that is more time efficient (e.g., has a lesser number of turns, includes paved terrain, has a lower climb distance, etc.) when traveling to work, and may select a workout-centric route (e.g., a greater number of turns, a gravel terrain, a higher climb distance, etc.) when traveling home from work. Other examples are possible.

In the following discussion, an example mobile electronic device environment is first described. Exemplary procedures are then described that may be employed with the example environment, as well as with other environments and devices without departing from the spirit and scope thereof.

Example Environment

FIG. 1 illustrates an example mobile electronic device environment 100 that is operable to perform the techniques discussed herein. The environment 100 includes a mobile electronic device 102 operable to provide navigation functionality to the user of the device 102. The mobile electronic device 102 may be configured in a variety of ways. For instance, a mobile electronic device 102 may be configured for use during fitness and/or sporting activities and comprise a cycle computer, a sport watch, a golf computer, a smart phone providing fitness or sporting applications (apps), a hand-held GPS device used for hiking, and so forth. However, it is contemplated that the techniques may be implemented in any mobile electronic device that includes navigation functionality. Thus, the mobile electronic device may also be configured as a portable navigation device (PND), a mobile phone, a hand-held portable computer, a tablet computer, a personal digital assistant, a multimedia device, a media player, a game device, combinations thereof, and so forth. In the following description, a referenced component, such as mobile electronic device 102, may refer to one or more entities, and therefore by convention reference may be made to a single entity (e.g., the mobile electronic device 102) or multiple entities (e.g., the mobile electronic devices 102, the plurality of mobile electronic devices 102, and so on) using the same reference number.

In FIG. 1, the mobile electronic device 102 is illustrated as including a processor 104 and a memory 106. The processor 104 provides processing functionality for the mobile electronic device 102 and may include any number of processors, micro-controllers, or other processing systems, and resident or external memory for storing data and other information accessed or generated by the mobile electronic device 102. The processor 104 may execute one or more software programs that implement the techniques and modules described herein. The processor 104 is not limited by the materials from which it is formed or the processing mechanisms employed therein and, as such, may be implemented via semiconductor(s) and/or transistors (e.g., electronic integrated circuits (ICs)), and so forth.

The memory 106 is an example of device-readable storage media that provides storage functionality to store various data associated with the operation of the mobile electronic device 102, such as the software program and code segments mentioned above, or other data to instruct the processor 104 and other elements of the mobile electronic device 102 to perform the techniques described herein. Although a single memory 106 is shown, a wide variety of types and combinations of memory may be employed. The memory 106 may be integral with the processor 104, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The mobile electronic device 102 is further illustrated as including functionality to determine position. For example, mobile electronic device 102 may receive signal data 108 transmitted by one or more position data platforms and/or position data transmitters, examples of which are depicted as the GPS satellites 110. More particularly, mobile electronic device 102 may include a position-determining module 112 that may manage and process signal data 108 received from Global Positioning System (GPS) satellites 110 via a GPS receiver 114. The position-determining module 112 is representative of functionality operable to determine a geographic position through processing of the received signal data 108. The signal data 108 may include various data suitable for use in position determination, such as timing signals, ranging signals, ephemerides, almanacs, and so forth.

Position-determining module 112 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, the position-determining module 112 may be configured in a variety of ways to perform a wide variety of functions. For example, the position-determining module 112 may be configured for outdoor navigation, vehicle navigation, aerial navigation (e.g., for airplanes, helicopters), marine navigation, personal use (e.g., as a part of fitness-related equipment), and so forth. Accordingly, the position-determining module 112 may include a variety of devices to determine position using one or more of the techniques previously described.

The position-determining module 112, for instance, may use signal data 108 received via the GPS receiver 114 in combination with map data 116 that is stored in the memory 106 to generate navigation instructions (e.g., turn-by-turn instructions to an input destination or POI), show a current position on a map, and so on. Position-determining module 112 may include one or more antennas to receive signal data 108 as well as to perform other communications, such as communication via one or more networks 118 described in more detail below. The position-determining module 112 may also provide other position-determining functionality, such as to determine an average speed, calculate an arrival time, and so on.

Although a GPS system is described and illustrated in relation to FIG. 1, it should be apparent that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, and magnetometers), use of "dead reckoning" techniques, and so on.

The mobile electronic device 102 includes a display 120 to display information to a user of the mobile electronic device 102. In embodiments, the display 120 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display 120 may be backlit via a backlight such that it may be viewed in the dark or other low-light environments.

The display 120 may be provided with a touch screen 122 to receive input (e.g., data, commands, etc.) from a user. For example, a user may operate the mobile electronic device 102 by touching the touch screen 122 and/or by performing gestures on the screen 122. In some embodiments, the touch screen 122 may be a capacitive touch screen, a resistive touch screen, an infrared touch screen, combinations thereof, and the like. The mobile electronic device 102 may further include one or more input/output (I/O) devices 124 (e.g., a keypad, buttons, a wireless input device, a thumbwheel input device, a trackstick input device, and so on). The I/O devices 124 may include one or more audio I/O devices, such as a microphone, speakers, and so on.

The mobile electronic device 102 may also include a communication module 126 representative of communication functionality to permit mobile electronic device 102 to send/receive data between different devices (e.g., components/peripherals) and/or over the one or more networks 118. Communication module 126 may be representative of a variety of communication components and functionality including, but not limited to: one or more antennas; a browser; a transmitter and/or receiver; a wireless radio; data ports; software interfaces and drivers; networking interfaces; data processing components; and so forth.

The one or more networks 118 are representative of a variety of different communication pathways and network connections which may be employed, individually or in combinations, to communicate among the components of the environment 100. Thus, the one or more networks 118 may be representative of communication pathways achieved using a single network or multiple networks. Further, the one or more networks 118 are representative of a variety of different types of networks and connections that are contemplated including, but not limited to: the Internet; an intranet; a satellite network; a cellular network; a mobile data network; wired and/or wireless connections; and so forth.

Examples of wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

The mobile electronic device 102 through functionality represented by the communication module 126 may be configured to communicate via one or more networks 118 with a cellular provider 128 and an Internet provider 130 to receive mobile phone service 132 and various content 134, respectively. Content 134 may represent a variety of different content, examples of which include, but are not limited to: map data, which may include route information; web pages; services; music; photographs; video; email service; instant messaging; device drivers; real-time and/or historical weather data; instruction updates; and so forth.

The mobile electronic device 102 is illustrated as including a user interface 136, which is storable in memory 106 and executable by the processor 104. The user interface 138 is representative of functionality to control the display of information and data to the user of the mobile electronic device 102 via the display 120. In some implementations, the display 120 may not be integrated into the mobile electronic device and may instead be connected externally using universal serial bus (USB), Ethernet, serial connections, and so forth. The user interface 136 may provide functionality to allow the user to interact with one or more applications 138 of the mobile electronic device 102 by providing inputs via the touch screen 122 and/or the I/O devices 124. For example, the user interface 136 may cause an application programming interface (API) to be generated to expose functionality to an application 138 to configure the application for display by the display 120 or in combination with another display. In embodiments, the API may further expose functionality to configure the application 138 to allow the user to interact with an application by providing inputs via the touch screen 122 and/or the I/O devices 124.

Applications 138 may comprise software, which is storable in memory 106 and executable by the processor 104, to perform a specific operation or group of operations to furnish functionality to the mobile electronic device 102. Example applications may include fitness application, exercise applications, health applications, diet applications, cellular telephone applications, instant messaging applications, email applications, photograph sharing applications, calendar applications, address book applications, and so forth.

In implementations, the user interface 136 may include a browser 140. The browser 140 enables the mobile electronic device 102 to display and interact with content 134 such as a webpage within the World Wide Web, a webpage provided by a web server in a private network, and so forth. The browser 140 may be configured in a variety of ways. For example, the browser 140 may be configured as an application 138 accessed by the user interface 136. The browser 140 may be a web browser suitable for use by a full resource device with substantial memory and processor resources (e.g., a smart phone, a personal digital assistant (PDA), etc.). However, in one or more implementations, the browser 140 may be a mobile browser suitable for use by a low-resource device with limited memory and/or processing resources (e.g., a mobile telephone, a portable music device, a transportable entertainment device, etc.). Such mobile browsers typically conserve memory and processor resources, but may offer fewer browser functions than web browsers.

The mobile electronic device 102 is illustrated as including a navigation module 142, which is storable in memory 106 and executable by the processor 104. The navigation module 142 represents functionality to access map data 116 that is stored in the memory 106 to provide mapping and navigation functionality to the user of the mobile electronic device 102. For example, the navigation module 142 may generate navigation information that includes maps and/or map-related content for display by display 120. As used herein, map related content includes information associated with maps generated by the navigation module 142 and may include route information, POIs, information associated with POIs, map legends, controls for manipulation of a map (e.g., scroll, pan, etc.), street views, aerial/satellite views, and the like, displayed on or as a supplement to one or more maps.

In one or more implementations, the navigation module 142 is configured to utilize the map data 116 to generate navigation information 144 that includes maps and/or map-related content for display by the mobile electronic device 102 independently of content sources external to the mobile electronic device 102. Thus, for example, the navigation module 142 may be capable of providing mapping and navigation functionality when access to external content 134 is not available through network 118. It is contemplated; however, that the navigation module 142 may also be capable of accessing a variety of content 134 via the network 118 to generate navigation information including maps and/or map-related content for display by the mobile electronic device 102 in one or more implementations.

The navigation module 142 may be configured in a variety of ways. For example, the navigation module 142 may be configured as an application 138 accessed by the user interface 136. The navigation module 142 may utilize position data determined by the position-determining module 112 to show a current position of the user (e.g., the mobile electronic device 102) on a displayed map, furnish navigation instructions (e.g., turn-by-turn instructions to an input destination or POI), calculate traveling distances and times, and so on.

As illustrated in FIG. 1, the navigation module 142 further includes a route selection module 146, which is also storable in memory 106 and executable by the processor 104. The route selection module 146 causes the display 120 of the mobile electronic device 102 to be configured to display route selection information 148. In the implementation shown, the route selection information 148 is illustrated in the format of a map page 150 that includes a route graphic 152 representing a route that may be traversed by a user of the mobile electronic device 102 (e.g., by the user, by a vehicle (e.g., a bicycle) operated by the user in or on which the mobile electronic device 102 is mounted or carried or some combination thereof). The route describes a path that the user may traverse from a starting point to a destination. In an implementation, the starting point may be a geographic position determined by the position-determining module 112 of the device 102, such as the current geographic location of the device 102. However, the starting point may also be manually designated by the user through the user interface 136. As discussed herein below, the route selection module 146 further includes functionality to cause the display 120 to, sequentially or simultaneously, display additional route graphics 152 for one or more alternate routes (e.g., a second route, a third route, and so forth) that may also be traversed by the user to the same destination point. The route represented by each route graphic 152 can comprise, without limitation, any navigable path, trail, road, lane, street, pike, highway, tollway, freeway, interstate highway, sidewalk, combinations thereof, or the like, that may be traversed by a user of the mobile electronic device 102.

The route selection module 146 may include functionality (or may invoke functionality provided by the navigation module 142) to generate one or more routes to a destination from a starting point. These routes may, for example, be generated using map data 116 stored in memory 106 of the device 102. For instance, utilizing the A* search algorithm, or other path-finding and graph traversal algorithms like Dijkstra's algorithm, the route selection module 146 may identify a plurality of routes from the starting point to the destination. In some implementations, the map data 116 may include a plurality of node segments (e.g., path segments) which may be costed using various factors like speed, distance, time, elevation, difficulty, and the like, to compute the plurality of routes using A* and/or other path-finding algorithms. Thus, for instance, the route selection module 146 may generate three routes having the three shortest distances between the starting point and the destination, generate two routes having the easiest and hardest difficulty between the starting point and the destination, generate multiple routes having minimal, maximum, and average elevation changes between the starting point and the destination, generate all possible routes that may be traversed within a given time period such as within 10, 15, 30, 60 minutes of the shortest route, combinations thereof, and the like. As discussed in more detail below, the user may provide input to control how the route selection module 146 performs costing to tailor the generated routes to specific user needs.

In at least some instances, the starting point may be the current geographic position of the mobile electronic device 102 determined by the position determining module 112. However, it is contemplated that the starting point may be input by the user of the mobile electronic device via the display 120 and touch screen 122 and/or I/O devices 124. Similarly, the destination may be entered or selected by the user of the mobile electronic device 102. The destination may be entered as latitude/longitude information associated with a location, an address, a POI, a user-selected point (e.g., user selects a desired destination point via the touch screen 122) on a map displayed by the display 120, a destination selected from content 134 received via the communication module 126 and/or stored in memory 106 by the mobile electronic device 102 (e.g., a webpage, an email, a text message, a photograph, etc.), and so on.

In some configurations, the route selection module 146 may select possible routes using historical route information stored within a local route database on the device 102 and/or accessible through a remote route database using the communication module 126. The route database(s) may include a plurality of previously-traversed routes that may be searched, indexed, compiled, analyzed, or otherwise selected for travel by the user. Based on the current position, or another designated starting point, the route selection module 146 may identify stored routes that include or otherwise relate to the designated starting point. These corresponding stored routes may be presented to the user, in addition to or as an alternative to the calculated routes discussed above, for review and selection. For example, the corresponding routes accessed from the route database may include a difficult route starting at the current location, a short route ending at the current location, a long route including the current location, a scenic route including a user designated location, a composite route generated from one or more stored routes corresponding to the current location, combinations thereof, and the like. The presentation of the stored routes may include community data such as user comments regarding the stored routes, user ratings, etc.

The route selection information 148 may be displayed in a variety of ways. For instance, in the example implementation illustrated in FIG. 2A, the route selection information 148 is displayed on a common map page 150 in an overlay configuration. As shown, multiple route graphics 152 representing alternate routes to the destination are simultaneously overlaid together on the map page 150. The route graphics 152 may be identified by providing indicia that distinguish each route graphic 152 from the other route graphics 152 displayed (e.g., a first route graphic 152 is identified with a first indicia (a solid line), a second route graphic 152 is identified with a second indicia (a dashed line), a third route graphic 152 is identified with a third indicia (a dotted line), and so forth). It is contemplated that a variety of indicia (other than line type)

may be employed to distinguish the different routes. For example, the different route graphics 152 may have different hues (e.g., colors), line weights, symbols, or the like to distinguish them from other route graphics 152. Where routes overlap, the indicia of the route graphics 152 may be combined, or the indicia of one route graphic 152 may be displayed over the other route graphics (e.g., the most direct route, the fastest route, and so on may be displayed). It is contemplated, that the specific indicia used (e.g., hues (colors), text, line types and weights, shading, etc.) may be selected to match or coordinate with display characteristics of the user interface 136 of the mobile electronic device 102.

Figure 2A:
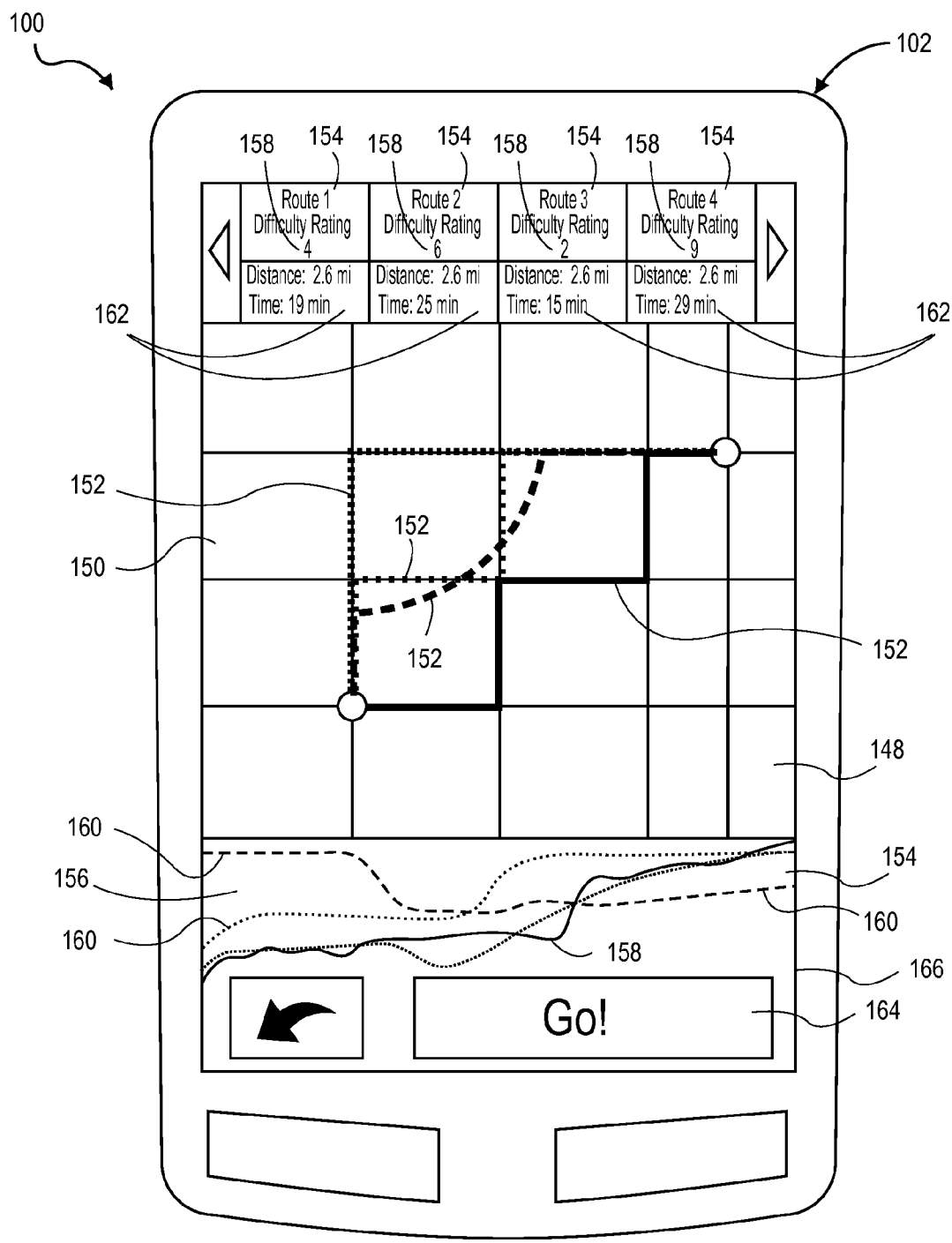
FIGS. 2A and 2B are illustrations depicting example display configurations of the display of the mobile electronic device shown in FIG. 1, for depicting alternate routes to a destination with metrics associated with each route that identify a characteristic of the route.
Figure 2B:
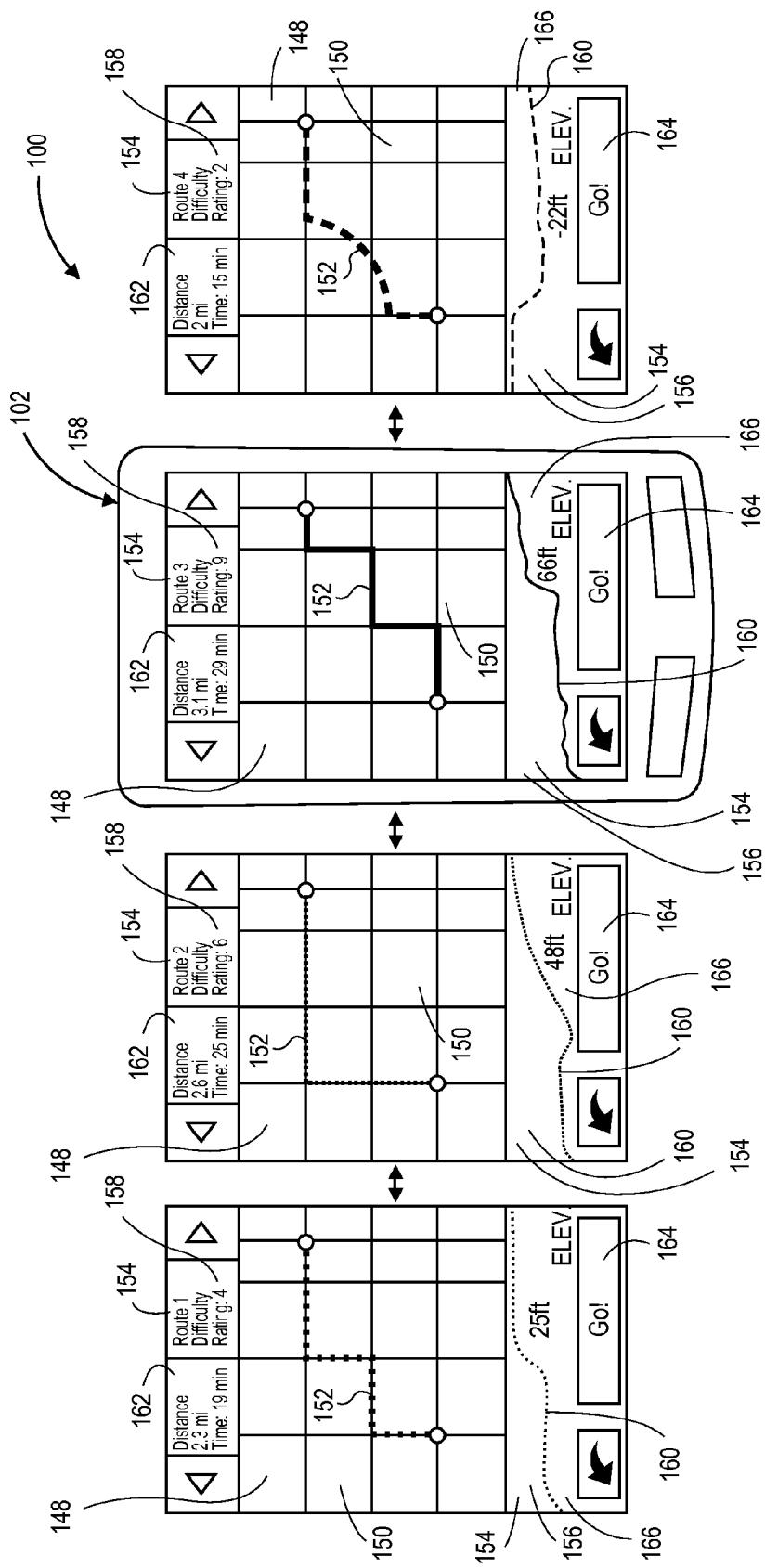

In another example implementation, illustrated in FIG. 2B, the route selection information 148 is displayed using scrollable, sequential, or otherwise discrete map pages 150. In this implementation, each route graphic 152 may be displayed in a separate instance of the map page 150. The various instances of the map page 150 may then be scrolled onto and off of the display 120 to facilitate selection of a desired route by the user. For example, as shown, a first route graphic 152 may be displayed in a first instance of the map page 150, a second route graphic 152 may be displayed in a second instance of the map page 150, a third route graphic 152 may be displayed in a third instance of the map page 150, a fourth route graphic 152 may be displayed in a fourth instance of the map page 150, and so forth. The user may provide a gesture to the touch screen 122 (e.g., swiping a finger across the touch screen 122 (a "flick") to scroll through the map pages 150 to review the different routes provided by the route selection module 146. For example, the user gestures across the touch screen 122 to move from a first map page 150, which displays a first route graphic 152, to a second map page 150, which displays a second route graphic 152, and so forth. Of course, the various instances of the map pages 150 may be accessed through methods other than, or in addition to, scrolling or touch scrolling. For example, the instances of the map page 150 may be accessed using any portions of the user interface 136 and/or through utilization of the I/O devices 124.

The route selection module 146 may be configured to determine one or more metrics 154 for each generated route to describe a characteristic or characteristics of the route. These metrics 154 may be furnished to the user as part of the route selection information 148 to help the user distinguish a desired route from the route options provided. As shown in FIG. 1, the route selection module 146 may cause the metrics 154 to be associated with the route graphic 152 displayed by the display 120 (e.g., the metrics 154 for each route may be displayed on the map page 150 proximate to the route graphic 152 representing the route).

Metrics 154 may be determined to describe a variety of characteristics of the route. In the examples illustrated, the metrics 154 comprise topographic information 156 about the route and/or a rating 158 calculated for the route. These metrics 154 are described in more detail below by way of example. However, it is contemplated that a wide variety of metrics 154 may be determined. For example, metrics 154 describing the availability of bicycle lanes, the scenic beauty of a route, the number of other users of devices in a particular system currently traversing a route, combinations thereof, and so forth, may be provided.

Topographic information 156 can include a wide variety of information that describes some characteristic of the route. For example, topographic information 156 may include information describing an elevation profile of the route, the number of turns or curves along the route, the total climb distance of the route from the starting point to the destination, maximum elevation change over a given distance (maximum slope), visual representation of terrain traversed by the route, combinations thereof, and so forth. The topographic information 156 may be acquired by the route selection module 146 from a variety of sources. For example, the topographic information 156 may be stored with the map data 116 in memory 106, acquired from content 134 accessed via the network 118 by the communication module, and so on. In implementations, the topographic information 156 is geo-referenced (e.g., cross-referenced with geo-spatial coordinate information, e.g., latitude, longitude, altitude, and so on) to identify the topography associated with the selected route(s).

In the examples illustrated in FIGS. 2A and 2B, the route selection module 146 (FIG. 1) may cause topographic information 156 comprising an elevation profile 160 associated with each route to be displayed as part of the map page 150 proximate to the route graphic 152 representing the route.

In FIG. 2A, the elevation profiles 160 are displayed within a pane 166 (e.g., defined by a window, frame, etc.) of the common map page 150 in an overlay configuration (the elevation profiles 160 are overlaid together within the pane 166). As shown, each elevation profile 160 may be keyed to its respective route graphics 152 via indicia shared by the elevation profile 160 and the route graphic 152 (e.g., a first route graphic 152 and its associated elevation profile 160 are identified with a shared first indicia (a solid line), a second route graphic 152 and its associated elevation profile 160 are identified with a shared second indicia (a dashed line), a third route graphic 152 and its associated elevation profile 160 are identified with a shared third indicia (a dotted line), and so forth). As noted, it is contemplated that a variety of indicia (other than line type) may be employed to distinguish the different routes. For example, the different route graphics 152 and associated elevation profiles 160 may be distinguished from one another by different hues (e.g., colors), line weights, symbols, or the like to distinguish them from other route graphics 152. Where elevation profiles 160 overlap, the indicia of the elevation profiles 160 may be combined, or the indicia of one elevation profile 160 may be displayed over the other elevation profiles 160 (e.g., the elevation profile 160 of the most direct route, the fastest route, and so on may be displayed). Again, it is contemplated, that the specific indicia used (e.g., hues (colors), text, line types and weights, shading, etc.) may be selected to match or coordinate with display characteristics of the user interface 136 of the mobile electronic device 102.

In FIG. 2B, the elevation profile 160 of each route graphic 152 is displayed in a pane 166 of each separate instance of the map page 150. As noted, the various instances of the map page 150 may then be scrolled or otherwise changed onto and off of the display 120 to facilitate selection of a desired route by the user. Thus, as shown, a first route graphic 152 and its associated elevation profile 160 may be displayed in a first instance of the map page 150, a second route graphic 152 and its associated elevation profile 160 may be displayed in a second instance of the map page 150, a third route graphic 152 and its associated elevation profile 160 may be displayed in a third instance of the map page 150, a fourth route graphic 152 and its associated elevation profile 160 may be displayed in a fourth instance of the map page 150, and so forth. As described, the user may provide a gesture to the touch screen 122 (e.g., swiping a finger across the touch screen 122 to scroll through the maps 150 to review the different routes provided by the route selection module 146. For example, the user gestures across the touch screen 122 to move from a first map page 150, which displays a first route graphic 152 and its associated elevation profile 160, to a second map page 150, which displays a second route graphic 152 and its associated elevation profile 160, and so forth. Of course, the various instances of the map page 150 and associated profiles 160 may be accessed through methods other than, or in addition to, scrolling or touch scrolling. For example, the instances of the map pages 150 and associated profiles 160 may be accessed using any portions of the user interface 136 and/or through utilization of the I/O devices 124.

As noted above, the metrics 154 may also comprise a rating 158 furnished instead of, or in addition to, the topographic information 156 or other metrics. A variety of rating schemes are possible. For instance, in the implementation illustrated, the rating 158 comprises a difficulty rating that furnishes a ranking describing a level of difficulty encountered by the user while navigating the route. The ratings 158 may have a variety of formats. For example, ratings 158 may be formatted as a numeric rating (e.g., a rating of "1" for low difficulty through "10" for high difficulty), as discrete difficulty levels (e.g., "High," "Medium," and "Low," or "Difficult,", "Average," and "Easy"), combinations thereof, and so on. For instance, in the example shown in FIGS. 2A and 2B, a low rating 158 (e.g., a difficulty rating of "1" through "5") may indicate that the route traverses terrain which is relatively easy to navigate and/or that there is little traffic present on the route. The route may have an at least substantially paved surface, be relatively flat (e.g., has minimal climb distance, such as fifty (50) feet or less), have a low number of turns (e.g., ten (10) turns or less), and so forth. Conversely, a high rating 158 (e.g., a difficulty rating of "6" through "10") may indicate that the route traverses terrain that is relatively difficult to navigate. The route may include unpaved sections (e.g., gravel or dirt roadways), is relatively steep (e.g., has a high climb distance, such as five hundred (500) feet), have a high number of turns (e.g., fifty (50) turns or more), and so forth. In an implementation, the ratings 158 may be preprogrammed (e.g., into the map data 116) or may be calculated based on pre-determined criteria. In another implementation, the ratings 158 may comprise a user-defined difficulty rating entered by the user (e.g., the user enters a user-selected difficulty rating, the user overrides the default difficulty rating with a user-selected difficulty rating, etc.).

A variety of criteria may be considered to determine the rating 158 of a route. Such criteria may include, but are not limited to: the route width, the surface of the route (e.g., loose gravel vs. paved route), the number of other vehicles and/or individuals that utilize the route during a specified time period (e.g., route may be busier at 8 A.M. than at 2:00 PM due to people going to work, etc.), the number of hills associated with each route, a grade (e.g., steepness) of each hill in the route, a terrain rating of the route, a total climb distance (e.g., the climb distance from the starting point to the destination point, the climb distance from the lowest elevation point of the route to the highest elevation point of the route, etc.), real-time or historical weather associated with the route (e.g., bad weather such as rain may increase difficulty), combinations thereof, and so forth.

As shown, the route selection module 146 may further cause distance/time information 162 to be displayed on the map page(s) 150. The distance/time information 162 may include a distance to and/or an estimated time remaining to the desired destination from the current position of the mobile electronic device 102. In implementations, the navigation module 142 may utilize the determined position of the device 102 from the position-determining module 112 and the map data 116 to determine the distance/time information 162. The distance/time information 162 may be dynamically updated by the navigation module 142 as the mobile electronic device 102 is moved. For example, the distance and time to the destination may decrease as the mobile electronic device 102 is brought nearer to the destination. Conversely, the distance and time to the destination may increase as the device 102 is taken farther away from the destination. The distance/time information may vary for each route to the destination depending on factors such as the length of the route, posted speed limits along the route, and so forth.

The route selection module 146 includes functionality to receive a desired route selection from a user of the mobile electronic device 102. For example, where route selection information 148 is presented in the overlay configuration illustrated in FIG. 2A, the user may select a desired route by providing an input proximate to the desired route graphic 152 (and/or elevation profile 160) via the touch screen 122 (e.g., tapping the user's finger proximate to the route graphic 152 on the touch screen 122). The user may then cause the selected route to be navigated via selection of an input (e.g., by tapping touch screen 122 over the "Go!" button 164).

Where route selection information 148 is presented in separate map pages as illustrated in FIG. 2B, the user may "flick" scroll to the map page 150 displaying the desired route graphic 152 and metric 154. The user may then select the route via an input (e.g., by tapping touch screen 122 over the "Go!" button 164). In this example, it is contemplated the user may also select the desired route by tapping the user's finger proximate to the displayed route graphic 152. Of course, any portions of the user interface 136 and/or I/O devices 124 may be used to select a desired route.

Figure 2C:
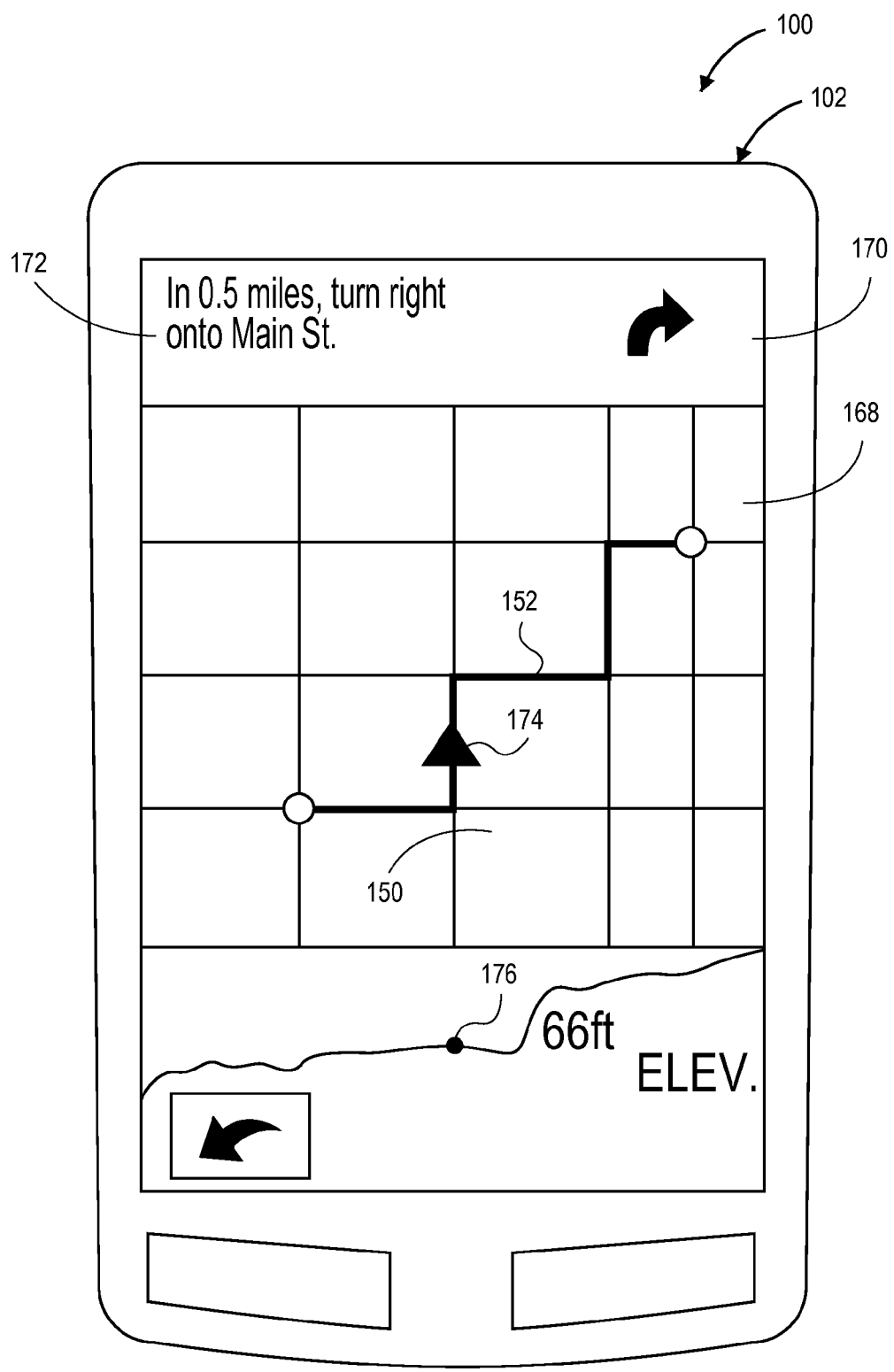
FIG. 2C is an illustration depicting an example display of the mobile electronic device shown in FIG. 1, wherein a map depicting the selected route to the destination is displayed with the metrics associated with the route.

The route selection module 146 (or the navigation module 142) may then cause a map 168 to be displayed on map page 150 by the display 102, as shown in FIG. 2C, to furnish navigation information 170 for the selected route to facilitate navigation to the destination. As illustrated, the navigation information 170 may include turn-by-turn directions 172 (e.g., "In 0.5 miles turn right onto Main St.") and indicia 174, 176 indicating the position of the user along the route graphic 152 and/or the elevation profile 160. However, it is contemplated that a wide variety of navigation information 170 may be provided. For example, navigation information 170 that may be provided may include, but is not limited to: depictions of terrain, buildings, and so forth along the route; speed limit information; traffic information; road construction information; weather information; predicted time of arrival; distance and time to the destination; and upcoming turn information. Audio and other visual cues may also be provided by the device 102 to assist navigation along the desired route. For example, audible turn-by-turn voice directions may be given to direct the user along the desired route.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the mobile electronic device 102 of FIG. 1 can be wired, wireless, or some combination thereof. In the case of a software implementation, for instance, the module represents executable instructions that perform specified tasks when executed on a processor, such as the processor 104 with the mobile electronic device 102 of FIG. 1. The program code can be stored in one or more device-readable storage media, an example of which is the memory 106 associated with the mobile electronic device 102 of FIG. 1.

Example Procedures

The following discussion describes procedures that may be implemented in a mobile electronic device providing navigation functionality. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIGS. 1, 2A, and 2B. The features of techniques described below are platform-independent, meaning that the techniques may be implemented on a variety of commercial mobile electronic device platforms having a variety of processors.

Figure 3:
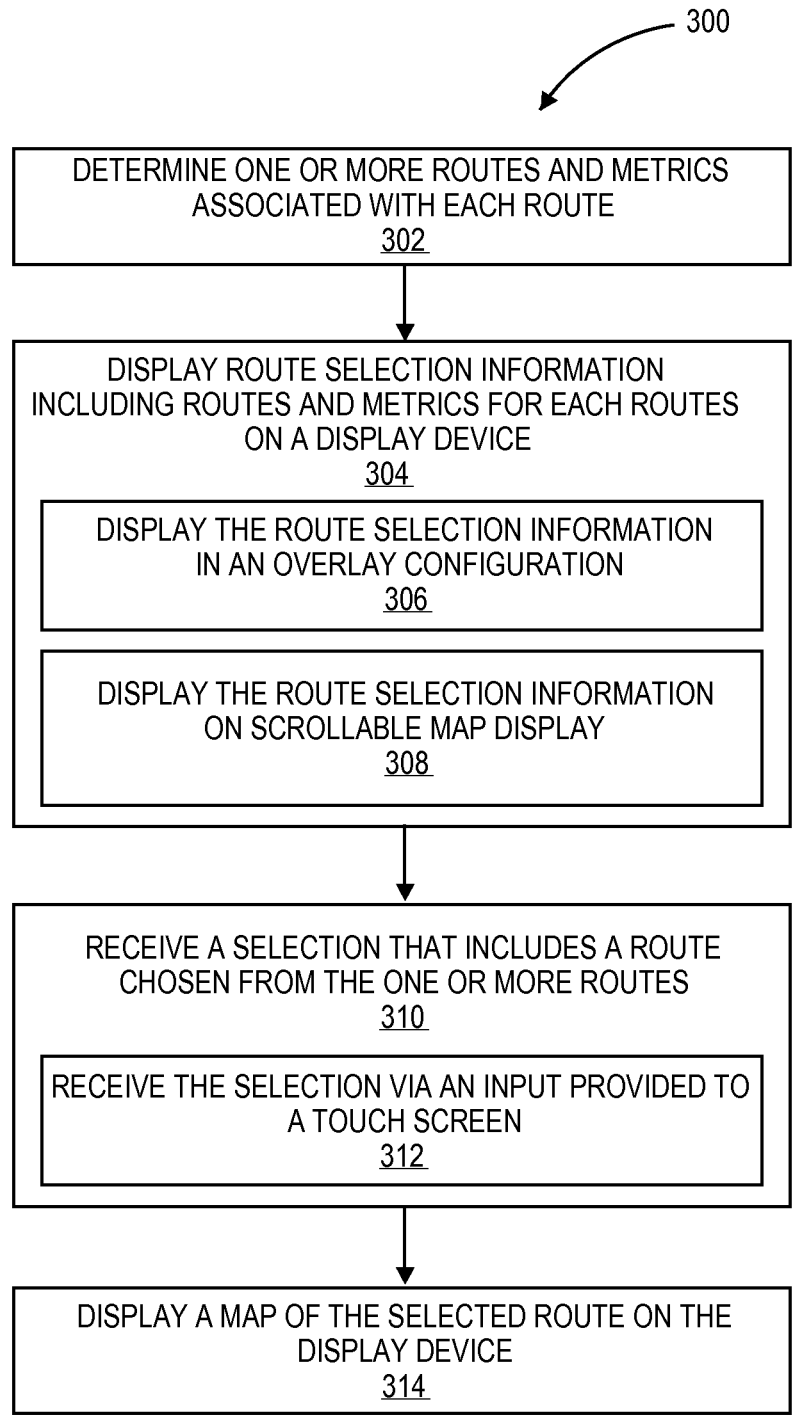
FIG. 3 is a flow diagram depicting a procedure in an example implementation in which a mobile electronic device providing navigation functionality is configured to facilitate the selection of a route to a destination from multiple route options.

FIG. 3 depicts a procedure 300 in an example implementation in which a mobile electronic device is configured to facilitate the selection of a route to a destination from multiple route options. As shown in FIG. 3, two or more routes to the destination are first determined along with one or more metrics associated with each route (Block 302) for describing a characteristic or characteristics of the route. Route selection information is then displayed on a display of the mobile electronic device (Block 304). The route selection information includes depictions of the two or more routes to the destination as well as the metrics associated with each of the routes. For example, as shown in FIGS. 1, 2A, and 2B, the route selection information may be displayed on a map page 150, and may include two or more route graphics 152 representing the two or more routes to the destination, an estimated travel time for each route to the destination, a distance of each route to the destination, and so forth, in addition to the metrics 154. The metrics 154 may include, but are not limited to: topography information for each route (e.g., an elevation profile 160, and/or a rating 158 of each route (e.g., a difficulty rating, a terrain rating of the route, a number of turns along the route), combinations thereof, and so forth.

In one or more implementations, the route selection information including metrics for each route may be displayed in an overlay configuration (Block 306), as illustrated in FIG. 2A. In other implementations, as illustrated in FIG. 2B, the route selection information for each route may be displayed on a scrollable or sequential map display (Block 308). In such implementations, the user may "flick" scroll through each map display by providing a gesture to the mobile electronic device (e.g., swiping a finger across the touch screen of the mobile electronic device, engaging a key of the mobile electronic device, or the like). Other implementations are possible.

A selection is then received, from the user via an input to the mobile electronic device, that includes a route chosen from the one or more routes presented (Block 310). In one or more implementations, the selection may be received via an input provided to a touch screen (Block 312) of the mobile electronic device. For example, as shown in FIGS. 2A and 2B, the user may select the route he or she wishes to traverse by using the touch screen 122 (e.g., by tapping the "Go!" button 164). In other implementations, the user may select a desired route by tapping the touch screen 122 in a position proximate to the desired route's route graphic (and/or elevation profile).

A map of the selected route is then displayed on the display device (Block 312). The map is configured to furnish navigation information for the selected route to facilitate navigation to the destination. As shown in FIG. 2C, the map 168 and navigation information 170 may be comprised of map and/or map-related content 172, 174, 176 associated with the route to the destination. The navigation information 170 may be generated utilizing position data to show a current position of the user on the displayed map, furnish navigation instructions (e.g., turn-by-turn directions to the destination), calculate traveling distances and times, and so on.

CONCLUSION

Although techniques to facilitate the selection of a route to a destination from multiple route options have been described in language specific to structural features and/or methodological acts, it is to be understood that the appended claims are not necessarily limited to the specific features or acts described. Rather, the specific features and acts are disclosed as exemplary forms of implementing the claimed devices and techniques.

What is claimed is:

1. A mobile electronic device comprising:
a display;
an input device;
a memory operable to store one or more modules and topographic information; and
a processing system operable to execute the one or more modules to:
cause route selection information to be displayed on the display, the route selection information including a graphic display of two or more routes to a destination and a graphic display of a topographic characteristic based on the stored topographic information for each of the routes;
receive a selection via the input device, the selection including a selected route chosen from the two or more routes; and
cause a map to be displayed on the display, the map configured to furnish navigation information for the selected route to facilitate navigation to the destination;
wherein the topographic characteristic includes elevation information.

2. The mobile electronic device as recited in claim 1, wherein the route selection information further comprises at least one of an estimated travel time to the destination and a distance to the destination for each of the routes.

3. The mobile electronic device as recited in claim 1, wherein the processing system is further operable to calculate a level of difficulty encountered while navigating each of the routes and cause the difficulty levels to be displayed on the display.

4. The mobile electronic device as recited in claim 1, wherein the processing system is operable to cause an elevation profile for each route to be displayed graphically adjacent the corresponding route.

5. The mobile electronic device as recited in claim 1, wherein the routes are simultaneously displayed on the display in an overlay configuration.

6. The mobile electronic device as recited in claim 1, wherein the routes are displayed on separate screens, the display operable to facilitate scrolling of the screens to cause the routes to be sequentially displayed.

7. The mobile electronic device as recited in claim 1, further comprising a position-determining module operable to receive satellite navigation signals and determine a geographic position of the mobile electronic device using the received satellite navigation signals, the module configured to use the determined geographic position to generate the routes to the destination and to locate a position of the mobile electronic device on the map.

8. A mobile electronic device comprising:
a memory configured to store map data and topographic information;
a display configured to display information to a user of the mobile electronic device;

an input device configured to receive an input from the user of the mobile electronic device;

a position-determining module operable to receive satellite navigation signals and determine a geographic position of the portable electronic device using the received satellite navigation signals; and a processing system operable to execute at least one module to:

generate two or more routes to a destination from the determined geographic position using the map data, each of the routes including an elevation profile based on the stored topographic information for the route;

cause route selection information to be displayed on the display, the route selection information including a graphical display of the routes and a graphical display of an elevation profile of the route;

receive a selection via the input device, the selection including a selected route chosen from the routes; and cause a map to be displayed on the display, the map configured to furnish navigation information for the selected route to facilitate navigation to the destination.

9. The mobile electronic device as recited in claim 8, wherein the topographic information is displayed graphically adjacent to the route.

10. The mobile electronic device as recited in claim 8, wherein the routes are simultaneously displayed on the display in an overlay configuration.

11. The mobile electronic device as recited in claim 8, wherein the routes are displayed on separate screens, the display operable to facilitate scrolling of the screens to cause the routes to be sequentially displayed.

12. The mobile electronic device as recited in claim 8, wherein the route selection information further comprises a difficulty rating associated with each of the routes, the difficulty rating calculated to describe a level of difficulty encountered while navigating the route.

13. A method comprising:

causing, using a processing system operable to execute the one or more modules, route selection information to be displayed on a display of a mobile electronic device, the route selection information including a graphic display of two or more routes to a destination and a graphic display of a topographic characteristic based on stored topographic information for each of the routes;

receiving, using the processor, a selection via an input device of the mobile electronic device, the selection including a selected route chosen from the routes; and causing, using the processor, a map to be displayed on the display, the map configured to furnish navigation information for the selected route to facilitate navigation to the destination;

wherein the mobile electronic device includes a memory operable to store the modules and the topographic information; and wherein the topographic characteristic includes elevation information.

14. The method as recited in claim 13, wherein the route selection information further comprises at least one of an estimated travel time to the destination and a distance to the destination for each of the routes.

15. The method as recited in claim 13, further including calculating and displaying a difficulty rating associated with each route, the difficulty rating calculated to describe a level of difficulty encountered while navigating the route.

16. The method as recited in claim 13, wherein the elevation information comprises an elevation profile of each of the routes, the elevation profile displayed graphically adjacent each of the displayed routes.

17. The method as recited in claim 13, wherein the routes are simultaneously displayed on the display in an overlay configuration.

18. The method as recited in claim 13, wherein each of the routes is displayed on separate screens that are scrollable to cause the routes to be sequentially displayed.

\* \* \* \* \*